(12) United States Patent
Allen et al.

(10) Patent No.: US 8,132,480 B2
(45) Date of Patent: Mar. 13, 2012

(54) PUMP GEAR AND PUMP ASSEMBLY FOR A GENERATOR

(75) Inventors: Edward C. Allen, Davis, IL (US);
Andrew P. Grosskopf, Rockford, IL (US); Brady A. Manogue, Beloit, WI (US); Eric A. Brust, Machesney Park, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 513 days.

(21) Appl. No.: 12/436,193

(22) Filed: May 6, 2009

(65) Prior Publication Data

US 2010/0284835 A1    Nov. 11, 2010

(51) Int. Cl.
*F16H 55/02* (2006.01)
*F16H 55/08* (2006.01)
*H02K 7/10* (2006.01)

(52) U.S. Cl. ............ 74/462; 74/457; 310/83; 417/423.1

(58) Field of Classification Search ............... 310/75 R, 310/83, 96, 99; 74/457, 458, 460, 462; 417/218, 417/399, 423.1
See application file for complete search history.

(56) References Cited

U.S. PATENT DOCUMENTS

| | | | | |
|---|---|---|---|---|
| 3,712,130 | A * | 1/1973 | Weichbrodt et al. ............ | 73/162 |
| 4,106,361 | A * | 8/1978 | Burtis .............................. | 74/462 |
| 4,309,152 | A * | 1/1982 | Hagen ............................ | 417/218 |
| 4,974,467 | A | 12/1990 | Cundy | |
| 5,152,141 | A | 10/1992 | Rumford et al. | |
| 5,184,465 | A | 2/1993 | Howard et al. | |
| 6,155,136 | A | 12/2000 | Telly et al. | |
| 6,396,165 | B1 | 5/2002 | Nagano et al. | |
| 6,571,655 | B2 * | 6/2003 | Tanaka ............................ | 74/462 |
| 6,656,079 | B2 * | 12/2003 | Eulenstein et al. ........... | 475/331 |
| 6,836,086 | B1 | 12/2004 | Goldberg et al. | |
| 6,838,778 | B1 | 1/2005 | Kandil et al. | |
| 6,838,779 | B1 | 1/2005 | Kandil et al. | |
| 7,208,854 | B1 | 4/2007 | Saban et al. | |
| 7,389,712 | B2 | 6/2008 | Himmelmann | |
| 7,926,381 | B2 * | 4/2011 | Grosskopf et al. ............. | 74/462 |
| 7,950,305 | B2 * | 5/2011 | Gutmann et al. ............... | 74/457 |
| 8,051,738 | B2 * | 11/2011 | Brust et al. ...................... | 74/462 |
| 2010/0301609 | A1 * | 12/2010 | Kim et al. ....................... | 290/54 |

* cited by examiner

*Primary Examiner* — Tran Nguyen
(74) *Attorney, Agent, or Firm* — Carlson, Gaskey & Olds, P.C.

(57) ABSTRACT

A pump gear includes a pump gear body having involute teeth that each have an involute surface that extends between a tooth tip and a tooth base. The involute surface includes at least reference points A-D, with reference point A near the base, reference point D near the tip, reference point B between reference points A and D, and reference point C between reference points B and D. The reference points A-D have associated respective roll angles, $\epsilon_{A-D}$, between a corresponding first line that is perpendicular to the involute surface at the given reference point A-D, and a second line that is tangent at a reference point that lies on a terminal end of the involute surface at the tooth base to a reference base circle having a center origin at the center axis.

19 Claims, 3 Drawing Sheets

US 8,132,480 B2

PUMP GEAR AND PUMP ASSEMBLY FOR A GENERATOR

BACKGROUND OF THE INVENTION

This disclosure relates to a modified pump gear for handling the expected stresses within a pump assembly of a generator.

Electrical generators typically include a shaft that is driven for rotation and which carries a plurality of field coils or permanent magnets. The generator may be used to also drive a hydraulic pump, such as for cooling the generator or other components of a system. A gear train may be used between the generator and the hydraulic pump. Misalignment of the gears within the gear train relative to the shafts, bearings, or other components, may increase wear on the gears and contribute to a reduction in gear durability. For instance, axial misalignment of the gears may cause uneven wear of the gear teeth and eventually necessitate replacement.

SUMMARY OF THE INVENTION

An exemplary pump gear includes a pump gear body having involute teeth that each have an involute surface that extends between a tooth tip and a tooth base. The involute surface includes at least reference points A-D, with reference point A near the base, reference point D near the tip, reference point B between reference points A and D, and reference point C between reference points B and D. The reference points A-D have associated respective roll angles, $\epsilon_{A-D}$, between a corresponding first line that is perpendicular to the involute surface at the given reference point A-D, and a second line that is tangent at a reference point that lies on a terminal end of the involute surface at the tooth base to a reference base circle having a center origin at the center axis.

In embodiments, the pump gear may be part of a pump assembly for a generator, with the pump gear mounted on a pump shaft that is rotatable about a central axis.

In embodiments, the pump gear may be part of a generator and may be mounted on a pump shaft within a pump that is operatively coupled to a rotor shaft of the generator through a gear train. The gear train may include a rotor gear mounted on the rotor shaft, an idler gear engaged with the rotor gear, and the pump gear, which is driven by the rotor gear through the idler gear. A rotor is mounted on the rotor shaft within a stator having a plurality of magnetic members circumferentially spaced around the rotor shaft.

An exemplary method for processing a pump gear for a generator may include forming the pump gear body and establishing the roll angle $\epsilon_A$ to be 11.96°-13.96°, the roll angle $\epsilon_B$ to be 14.79°-16.79°, the roll angle $\epsilon_C$ to be 23.29°-25.29°, and the roll angle $\epsilon_D$ to be 26.12°-28.12°.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
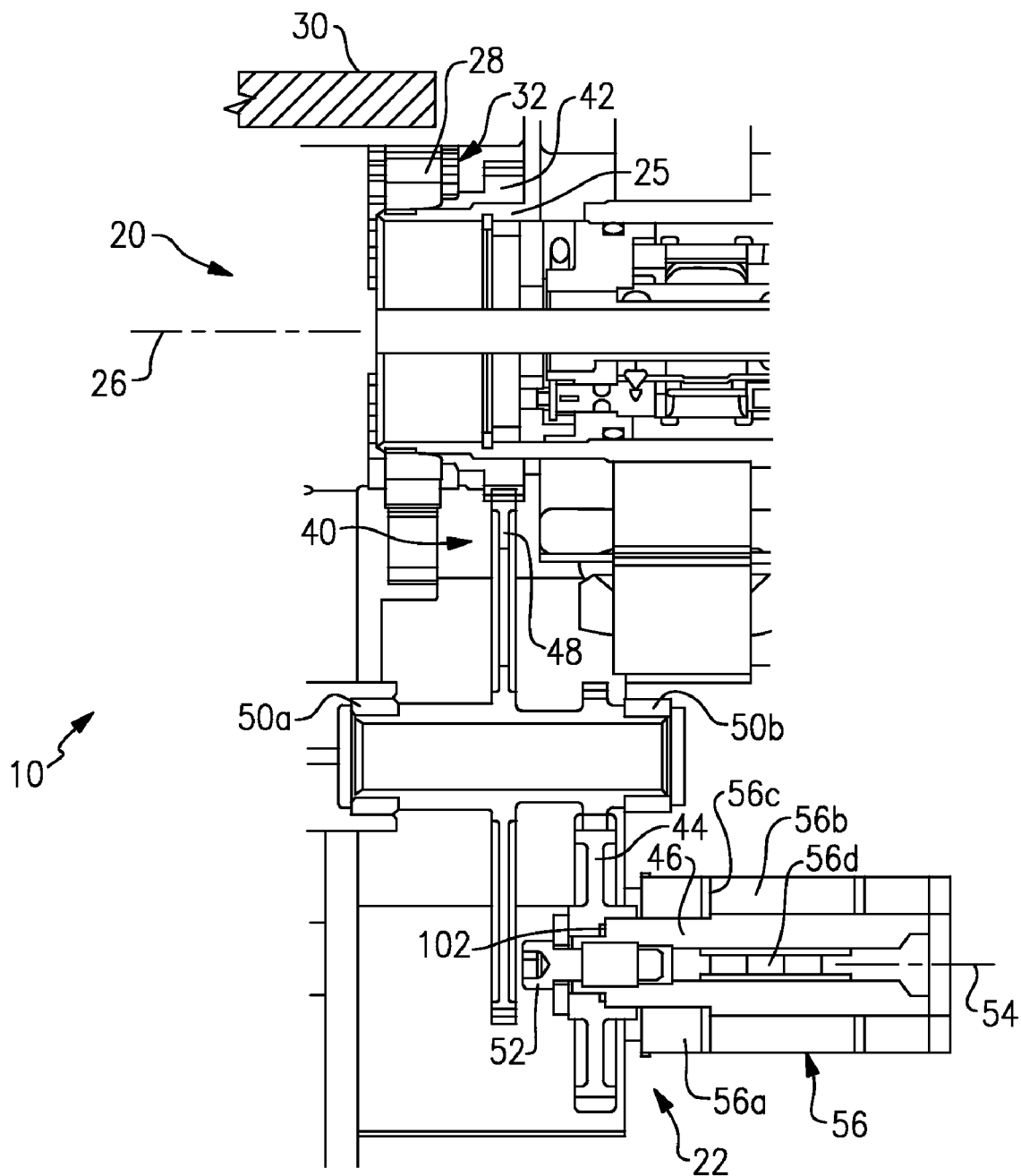
FIG. 1 illustrates an example generator having a pump and a gear train.

FIG. 1 illustrates selected portions of an example generator 10. For instance, the generator 10 may be a high speed, variable frequency generator for starting a turbine engine and generating electric current when being driven by the turbine engine.

In the illustrated example, the generator 10 includes a dynamoelectric portion 20, a hydraulic pump 22, and an idler gear 48 between the hydraulic pump 22 and the dynamoelectric portion 20. The dynamoelectric portion 20 includes a rotor shaft 25 that is rotatable about a central axis 26. A rotor 28 is mounted on the rotor shaft 25 to be driven about the central axis 26 within a stator 30 (shown in part). The rotor 28 includes a plurality of magnetic members 32, such as field coils or permanent magnets, circumferentially spaced about the rotor 28 relative to the central axis 26. The general arrangement of dynamoelectric machines is known and may vary from that shown in the illustrated examples.

The generator 10 includes a gear train 40 for driving the hydraulic pump 22 via the dynamoelectric portion 20. In this case, the gear train 40 is a gear reduction train to drive the hydraulic pump 22 at a relatively slower speed than the dynamoelectric portion 20. However, the gear train 40 may be modified in other examples.

The hydraulic pump 22 includes a pump gear 44 mounted for rotation on a pump shaft 46. In this case, the pump gear is mounted with a fastener 52 that extends axially, relative to a central axis 54 of a pump shaft 46, through the pump gear 44 into the pump shaft 46. The remainder 56 of the hydraulic pump 22 is a known arrangement and may include journal bearings 56a for rotatably supporting the pump shaft 46, a liner sleeve 56b, a wear plate 56c between the journal bearings 56a and liner sleeve 56b, and one or more vanes 56d that are rotatable with the pump shaft 46 for moving a fluid, for example.

The gear train 40 includes a rotor gear 42 mounted on the rotor shaft 25, the pump gear 44 mounted on the pump shaft 46 of the hydraulic pump 22, and an idler gear 48 mounted for rotation on journal bearings 50a and 50b. In this case, the dimensions of the journal bearings 50a and 50b may vary from part to part through normal manufacturing processes, design tolerances, or both such that there is possible axial and radial position variation of the idler gear 48 depending on the particular dimensions of the journal bearings 50a and 50b. However, as will be described, the exemplary pump gear 44 and pump shaft 46 are configured to facilitate reducing any effects from the dimensional variations of the journal bearings 50a and 50b.

Figure 2:
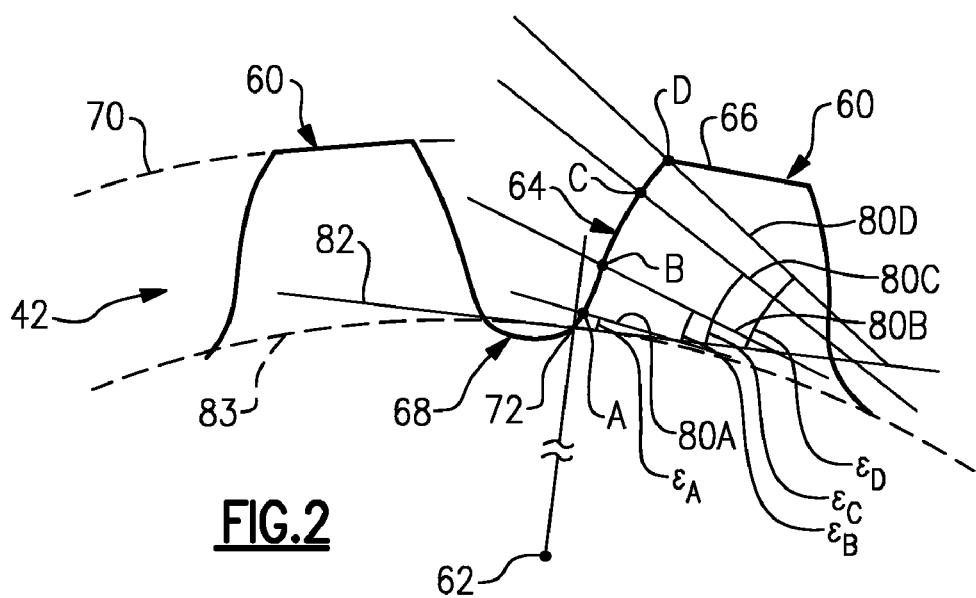
FIG. 2 illustrates gear teeth of a pump gear of the hydraulic pump in FIG. 1.

For instance, to increase the life of the pump gear 44 by increasing durability, the pump gear 44 includes teeth 60 (FIG. 2) that are designed with a shape that accommodates the specific loads expected from the high rotational speeds of the gear train 40. FIG. 2 illustrates several of the teeth 60 of the pump gear 44, which are circumferentially located about a center axis 62 of rotation (e.g., which is aligned with the central axis 54) of the pump shaft 46. In this case, the teeth 60 are involute teeth that each include at least one involute surface 64 that extends between a tooth tip 66 and a tooth base 68. As an example, the tooth tips 66 may be the surfaces or points of the teeth 60 that form the outermost diameter 70 of the rotor gear 42.

Each involute surface 64 may terminate on a radially outer end at the tip 66 and at a radially inner end at a point 72 near the base 68. For instance, the point 72 may represent the point at which the involute surface 64 inflects to form a valley between neighboring teeth 60.

In profile, the involute surface 64 includes at least reference points A-D thereon, with reference point A near the base 68, reference point B near the tip 66, reference point B between reference points A and D, and reference point C being between reference points B and D. In embodiments, reference point A may essentially be at the point 72 of the terminal end of the involute surface 64 and reference point D may essentially be at the radially outer terminal end of the involute surface 64. In some examples, the locations of reference points B and C may be a function of a distance between reference points A and D. In one example, reference point B is located 20% of the distance (from reference point A), and reference point C is located 80% of the distance (from reference point A).

Each of the reference points A-D includes an associated roll angle, $\epsilon_{A-D}$, between a corresponding first line 80A-D and a second line 82 that is tangent at the point 72 to a reference base circle 83 having a center origin at the center axis 62. For instance, the roll angles $\epsilon_{A-D}$ are subtended by a portion of the involute surface 64. The locations of the reference points A-D and the magnitudes of the roll angles $\epsilon_{A-D}$ may be determined using a known involute-checking machine.

The following examples suppose that reference point A is at the point 72 of the terminal end of the involute surface 64, reference point D is at the radially outer terminal end of the involute surface 64, reference point B is located 20% of the distance (from reference point A), and reference point C is located 80% of the distance (from reference point A). In one example, the roll angle $\epsilon_A$ is 11.96°-13.96°, the roll angle $\epsilon_B$ is 14.79°-16.79°, the roll angle $\epsilon_C$ is 23.29°-25.29°, and the roll angle $\epsilon_D$ is 26.12°-28.12°.

Utilizing roll angles $\epsilon_{A-D}$ within the given ranges provides a profile of the involute surface 64 that accommodates the expected specific loads on the pump gear 44 for the expected rotational speeds of the generator 10. That is, the radian measures of the given roll angles $\epsilon_{A-D}$ are the tangents of the pressure angles at the points on the involute surface 64 and are designed through the given roll angles $\epsilon_{A-D}$ to accommodate a particular stress state on the teeth 60.

In further examples, the roll angle $\epsilon_A$ is 12.46°-13.46°, the roll angle $\epsilon_B$ is 15.29°-16.29°, the roll angle $\epsilon_C$ is 23.79°-24.79°, and the $\epsilon_D$ is 26.62°-27.62°. In a further example, the roll angle $\epsilon_A$ is 12.96°, the roll angle $\epsilon_B$ is 15.79°, the roll angle $\epsilon_C$ is 24.29°, and the roll angle $\epsilon_D$ is 27.12°.

Figure 3:
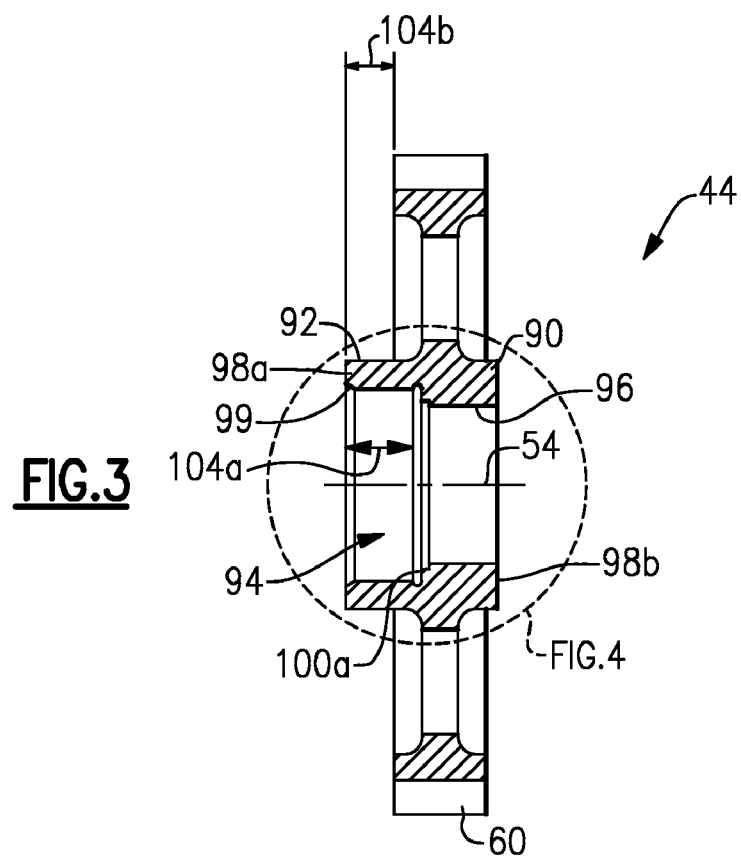
FIG. 3 illustrates a sectional view of an example pump gear.
Figure 4:
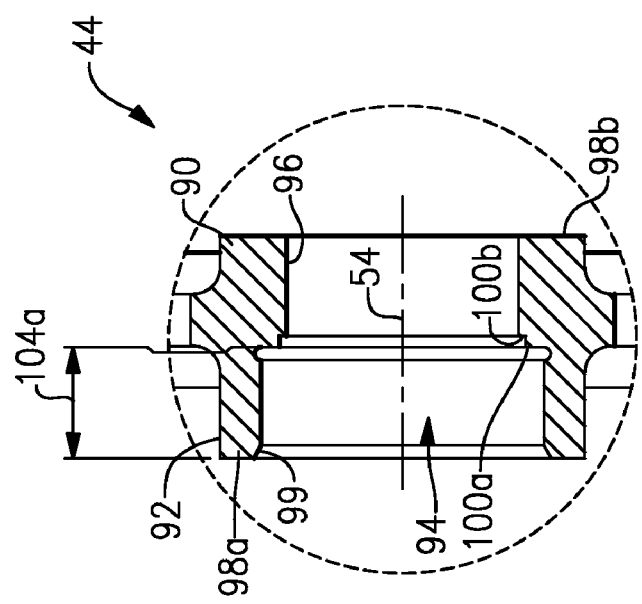
FIG. 4 illustrates another view of the pump gear in FIG. 3.

Referring to FIGS. 3 and 4, the pump gear 44 generally includes a gear body 90 that forms the teeth 60 along with a circumferential flange 92 that extends axially relative to the central axis 54. The teeth 60 may have an axial width 93 of 0.320-0.330 inches (0.813-0.838 centimeters). The pump gear 44 includes a central opening 94 bound by a circumferential wall 96 that extends between terminal axial faces 98a and 98b. The axial face 98a terminates on a radially inner end at a sloped wall 99, which is non-parallel and non-perpendicular to the axial face 98a and the central axis 54.

The central opening 94 may be non-circular (see FIG. 5) and include one or more flat sides 95 for rotationally locking with the pump shaft 46, which may also be non-circular and have corresponding flat sides.

The wall 96 includes a shoulder 100a (e.g., a step) for locating the pump gear 44 on the pump shaft 46. Likewise, the pump shaft 46 may include a corresponding shoulder 102 (FIG. 1) that abuts the shoulder 100a to locate the pump gear 44 at a desired axial position. In this example, the shoulder 100a is axially aligned with the teeth 60 such that the shoulder 100a is located between axial sides of the teeth 60 to provide the proper axial alignment between the teeth 60 of the pump gear 44 and the teeth of the idler gear 48.

As an example, the shoulder 100a is located a predetermined distance from the axial face 98a. In embodiments, an axial distance 104a between the axial face 98a and the shoulder 100a may be 0.270±0.003 inches (0.686±0.008 centimeters). An axial distance 104b from the axial face 98a to the nearest side of the involute teeth 60 may be 0.173±0.005 inches (0.439±0.013 millimeters). The distances from the shoulder 100a to the axial face 98a and shoulder 100a to the involute teeth 60 determine the axial position of the pump gear 44 for axial alignment with the idler gear 48. Thus, upon assembly of the generator 10, the pump gear 44 will be at a fixed position and aligned with the idler gear 48 such that any variation in the position of the idler gear 48 causes minimal misalignment with the pump gear 44.

In the illustrated example, the pump gear 44 may also include another shoulder 100b that is adjacent to the first shoulder 100a. In this regard, the shoulders 100a and 100b form two steps (i.e., a double shoulder). When the pump shaft 46 is inserted into the opening 94 of the pump gear 44, the end of the pump shaft 46 abuts the axial face of the shoulder 100a. The second shoulder 100b provides a clearance between the end of the pump shaft 46 and the remaining portion of the opening 94 such that the pump shaft 46 does not bottom out on another component that is adjacent to the pump gear 44.

Additionally, the pump gear 44 may include an undercut 106 that is immediately adjacent to the first shoulder 100a. In this case, the undercut 106 is on the side of the shoulder 100a that will receive the pump shaft 46. The undercut is recessed from the portion of the wall 96 to the left in the FIGS. 3 and 4 and provides the benefit of a clearance for the end of the pump shaft 46 to abut against the axial face of the shoulder 100a. In some cases, the end of the shaft may include a chamfer that could interfere with the press fit between the pump gear 44 and the pump shaft 46. However, the undercut 106 accommodates the chamfer, if present, to facilitate minimizing or avoiding any interference.

Figure 5:
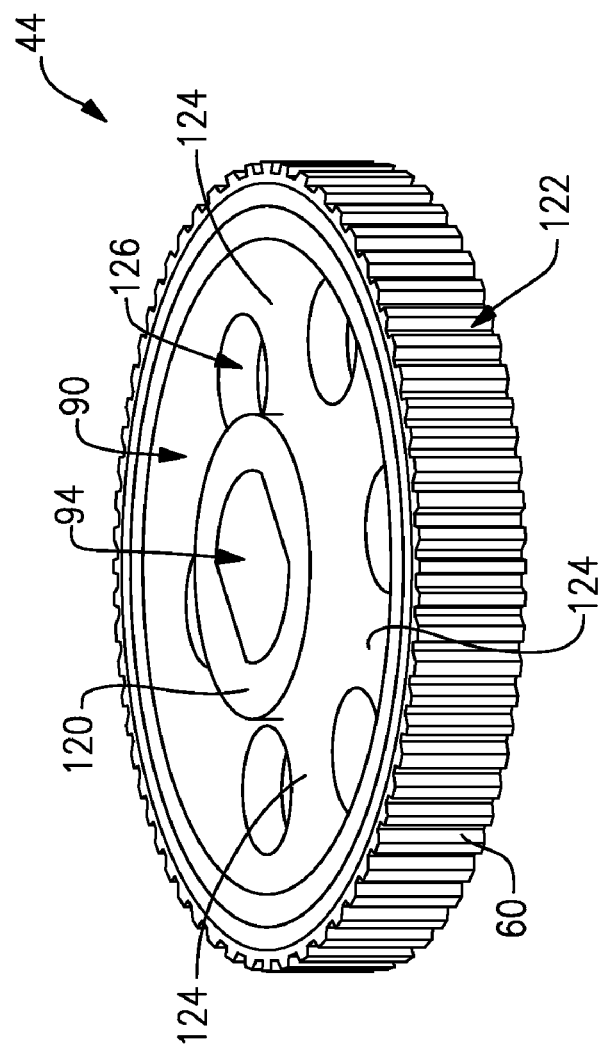
FIG. 5 illustrates a perspective view of the pump gear in FIG. 3.

FIG. 5 illustrates a perspective view of the pump gear 44. The gear body 90 may be a single, unitary piece of material having a hub portion 120 with the opening 94 and a rim portion 122 that extends circumferentially around the hub portion 120. Spokes 124 extend between and connect the hub portion 120 and the rim portion 122. The spokes 124 generally extend radially and are separated by openings 126. In this case, the openings 126 are circular; however, in other examples, the openings may have another shape, such as polygonal.

The spokes 124 provide strength and structural rigidity to the pump gear 44. In this case, the absence of any material in the openings 126 also reduces the overall weight of the pump gear 44 and thus the overall weight of the generator 10.

The pump gear 44 may be formed with the desired roll angles in a known gear manufacturing process. For instance, the process may include casting, forging, powder metallurgy, and/or machining from a blank. Thus, the process for forming the pump gear 44 is not limited to any particular type as long as the selected process is capable of establishing the roll angles to be within the given example ranges.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A pump gear for a generator, comprising:
a pump gear body having a plurality of involute teeth circumferentially located about a center axis of rotation, each of the plurality of involute teeth including an involute surface that extends between a tooth tip and a tooth base, the involute surface including at least reference points A-D thereon with reference point A near the base, reference point D near the tip, reference point B between reference points A and D, and reference point C between reference points B and D, the reference points A-D having respective roll angles, $\epsilon_{A-D}$, between a corresponding first line that is perpendicular to the involute surface at the given reference point A-D and a second line that is tangent at a reference point that lies on a terminal end of the involute surface at the tooth base to a reference base circle having a center origin at the center axis, and the roll angle $\epsilon_A$ is 11.96°-13.96°, the roll angle $\epsilon_B$ is 14.79°-16.79°, the roll angle $\epsilon_C$ is 23.29°-25.29°, and the roll angle $\epsilon_D$ is 26.12°-28.12°.

2. The pump gear as recited in claim 1, wherein the roll angle $\epsilon_A$ is 12.46°-13.46°, the roll angle $\epsilon_B$ is 15.29°-16.29°, the roll angle $\epsilon_C$ is 23.79°-24.79°, and the roll angle $\epsilon_D$ is 26.62°-27.62°.

3. The pump gear as recited in claim 1, wherein the roll angle $\epsilon_A$ is 12.96°, the roll angle $\epsilon_B$ is 15.79°, the roll angle $\epsilon_C$ is 24.29°, and the roll angle $\epsilon_D$ is 27.12.

4. The pump gear as recited in claim 1, wherein the pump gear body includes a wall that extends circumferentially around a central opening for receiving a pump shaft, the wall including a shoulder for locating the pump shaft and the opening is non-circular.

5. The pump gear as recited in claim 4, wherein the shoulder is axially aligned with the involute teeth.

6. The pump gear as recited in claim 4, wherein the pump gear body includes a circumferential flange extending axially and terminating at an axial face.

7. The pump gear as recited in claim 6, including an axial distance between the axial face and the shoulder that is 0.267-0.273 inches (0.678-0.693 centimeters).

8. The pump gear as recited in claim 7, wherein the pump gear body extends between the axial face and an opposing axial face and includes another axial distance of 0.168-0.178 inches (0.427-0.452 centimeters) from the opposing axial face to the shoulder.

9. The pump gear as recited in claim 1, wherein the pump gear body includes a hub portion having a central opening, a rim portion including the involute teeth, and spokes extending radially between and connecting the hub portion and the rim portion.

10. The pump gear as recited in claim 9, wherein the pump gear body includes circular openings between the spokes.

11. The pump gear as recited in claim 1, wherein the pump gear body includes a wall that extends circumferentially around a central opening for receiving a pump shaft, the wall including a double shoulder having two steps.

12. The pump gear as recited in claim 11, further comprising an undercut adjacent to the double shoulder.

13. The pump gear as recited in claim 1, wherein the involute teeth include an axial width of 0.320-0.330 inches (0.813-0.838 centimeters).

14. A pump assembly for a generator, comprising:
a pump shaft that is rotatable about a central axis; and
a pump gear mounted on the pump shaft, the pump gear having a gear body that includes a plurality of involute teeth circumferentially located about a center axis of rotation, each of the plurality of involute teeth including an involute surface that extends between a tooth tip and a tooth base, the involute surface including at least reference points A-D thereon with reference point A being near the base, reference point D near the tip, reference point B between reference points A and D, and reference point C between reference points B and D, the reference points A-D having respective roll angles, $\epsilon_{A-D}$, between a corresponding first line that is perpendicular to the involute surface at the given reference point A-D and a second line that is tangent at a reference point that lies on a terminal end of the involute surface at the tooth base and a reference base circle having a center origin at the center axis, and the roll angle $\epsilon_A$ is 11.96°-13.96°, the roll angle $\epsilon_B$ is 14.79°-16.79°, the roll angle $\epsilon_C$ is 23.29°-25.29°, and the roll angle $\epsilon_D$ is 26.12°-28.12°.

15. The pump assembly as recited in claim 14, wherein the pump gear is mounted on an end of the pump shaft with a fastener.

16. The pump assembly as recited in claim 14, wherein the gear body includes a wall that extends around a non-circular central opening for receiving the pump shaft, the wall including a shoulder for locating the pump shaft, and the pump shaft including a corresponding shoulder that abuts the shoulder of the gear body.

17. The pump assembly as recited in claim 14, further comprising a pump bearing rotatably supporting the pump shaft, a liner sleeve extending about the pump shaft adjacent to the pump bearing, a wear plate between the liner sleeve and the pump bearing, and at least one vane rotatable with the pump shaft.

18. A generator comprising:
a stator;
a rotor shaft that is rotatable;
a rotor mounted on the rotor shaft to be driven within the stator and having a plurality of magnetic members circumferentially spaced around the rotor shaft;
a gear train including a rotor gear mounted on the rotor shaft, an idler gear engaged with the rotor gear, and a pump gear operative to be driven by the rotor gear through the idler gear;
a pump operatively coupled to the rotor shaft through the gear train, the pump including a pump shaft on which the pump gear is mounted, the pump gear including a gear body having a plurality of involute teeth circumferentially located about a center axis of rotation, each of the plurality of involute teeth including an involute surface that extends between a tooth tip and a tooth base, the involute surface including at least reference points A-D thereon with reference point A being near the base, reference point D near the tip, reference point B between reference points A and D, and reference point C between reference points B and D, the reference points A-D having respective roll angles, $\epsilon_{A-D}$, between a corresponding first line that is perpendicular to the involute surface at the given reference point A-D and a second line that is tangent at a reference point that lies on a terminal end of the involute surface at the tooth base and a reference base circle having a center origin at the center axis, and the roll angle $\epsilon_A$ is 11.96°-13.96°, the roll angle $\epsilon_B$ is 14.79°-16.79°, the roll angle $\epsilon_C$ is 23.29°-25.29°, and the roll angle $\epsilon_D$ is 26.12°-28.12°.

19. A method for processing a pump gear for a generator, comprising:

forming a pump gear body having a plurality of involute teeth circumferentially located about a center axis of rotation, each of the plurality of involute teeth including an involute surface that extends between a tooth tip and a tooth base, the involute surface including at least reference points A-D thereon with reference point A near the base, reference point D near the tip, reference point B between reference points A and D, and reference point C between reference points B and D, the reference points A-D having respective roll angles, $\epsilon_{A-D}$, between a corresponding first line that is perpendicular to the involute surface at the given reference point A-D and a second line that is tangent at a reference point that lies on a terminal end of the involute surface at the tooth base to a reference base circle having a center origin at the center axis, and establishing the roll angle $\epsilon_A$ to be 11.96°-13.96°, the roll angle $\epsilon_B$ to be 14.79°-16.79°, the roll angle $\epsilon_C$ to be 23.29°-25.29°, and the roll angle $\epsilon_D$ to be 26.12°-28.12°.

* * * * *